(12) United States Patent
Sankaranarayanan et al.

(10) Patent No.: US 9,379,753 B2
(45) Date of Patent: Jun. 28, 2016

(54) ON-CHIP LINEARITY CALIBRATION

(71) Applicant: QUALCOMM Incorporated, San Diego, CA (US)

(72) Inventors: Janakiram Ganesh Sankaranarayanan, San Diego, CA (US); Ojas Mahendra Choksi, San Diego, CA (US); Hasnain Mohammedi Lakdawala, San Diego, CA (US); Wei Zhuo, San Diego, CA (US); Faramarz Sabouri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/507,623

(22) Filed: Oct. 6, 2014

(65) Prior Publication Data

US 2016/0080018 A1    Mar. 17, 2016

Related U.S. Application Data

(60) Provisional application No. 62/050,497, filed on Sep. 15, 2014.

(51) Int. Cl.
*H04B 1/10* (2006.01)
*H04B 1/12* (2006.01)
*H04B 17/21* (2015.01)
*H04W 88/02* (2009.01)

(52) U.S. Cl.
CPC ............... *H04B 1/123* (2013.01); *H04B 1/109* (2013.01); *H04B 17/21* (2015.01); *H04W 88/02* (2013.01)

(58) Field of Classification Search
CPC ............. H04L 1/20; H04L 1/24; H04L 1/242; H04L 1/243; H04B 3/46; H04B 17/11; H04B 17/14; H04B 17/15; H04B 17/19; H04B 17/21; H04B 17/24; H04B 17/29
USPC .......................................... 375/224, 227, 346
See application file for complete search history.

(56) References Cited

U.S. PATENT DOCUMENTS

| 6,714,588 B1 * | 3/2004 | Thomas ............... H04L 12/2854 375/219 |
| 7,203,472 B2 | 4/2007 | Seppinen et al. |
| 7,853,216 B1 * | 12/2010 | Breslin ................... H04B 17/11 455/101 |
| 8,035,447 B2 | 10/2011 | Liu et al. |
| 8,149,955 B2 | 4/2012 | Tired |

(Continued)

FOREIGN PATENT DOCUMENTS

| JP | 2010541367 A | 12/2010 |
| WO | 2010087177 A1 | 8/2010 |

OTHER PUBLICATIONS

CMCC: "Resource Allocation and PDCCH Design Issues in Carrier Aggregation", 3GPP TSG-RAN WG1 #55bis R1-090337, Jan. 12, 2009.

(Continued)

*Primary Examiner* — Khanh C Tran
(74) *Attorney, Agent, or Firm* — Procopio, Cory, Hargreaves & Savitch, LLP (57) ABSTRACT

An apparatus including: at least one receiver having injection points and having at least an amplifier and a transformer; and a plurality of isolation switches coupled to injection points of the at least one receiver, the plurality of isolation switches configured to route a calibration signal generated by a transmitter to one of the injection points.

20 Claims, 9 Drawing Sheets

(56) References Cited

U.S. PATENT DOCUMENTS

| | | | |
|---|---|---|---|
| 8,170,560 B2* | 5/2012 | Wu | H04W 36/0011 455/436 |
| 8,290,449 B2 | 10/2012 | Keehr et al. | |
| 2004/0219884 A1 | 11/2004 | Mo et al. | |
| 2005/0208901 A1* | 9/2005 | Chiu | H03H 7/42 455/78 |
| 2005/0208917 A1* | 9/2005 | Roufoogaran | H04B 1/0458 455/296 |
| 2007/0117524 A1* | 5/2007 | Do | H04B 1/44 455/83 |
| 2008/0139149 A1 | 6/2008 | Mu et al. | |
| 2008/0144707 A1* | 6/2008 | Tsfati | H04B 17/13 375/224 |
| 2009/0298441 A1* | 12/2009 | Chiu | H04B 1/40 455/73 |
| 2012/0177161 A1* | 7/2012 | Husted | G01S 19/235 375/371 |
| 2014/0036973 A1* | 2/2014 | Au | H03F 1/3247 375/221 |
| 2014/0242914 A1* | 8/2014 | Monroe | H04B 17/11 455/63.4 |

OTHER PUBLICATIONS

Huawei: "PDCCH design for carrier aggregation", 3GPP TSG RAN WG1#55bis R1-090127, Jan. 12, 2009.

Nokia et al., "L1 control signaling with carrier aggregation in LTE-Advanced", 3GPP Draft; R1-083730, 3rd Generation Partnership Project (3GPP), Mobile Competence Centre; 650, Route des Lucioles; F-06921 Sophia-Antipolis Cedex; France, No. Prague, Czech Republic; 20080924, Sep. 24, 2008, 7 pages, XP050317069, [retrieved on Sep. 24, 2008].

PDCCH blind decoding—Outcome of offline discussions, R1-081101, Internet Citation, Feb. 11, 2008, pp. 1-7, XP002534832, Retrieved from the Internet: URL:http://ftp.3gpp.org/tsg_ran/WG1_RL1/TSGR1_52/Docs/"C=N [retrieved on Jul. 2, 2009].

International Search Report and Written Opinion—PCT/US2015/045719—ISA/EPO—Nov. 20, 2015.

\* cited by examiner

ON-CHIP LINEARITY CALIBRATION

CROSS-REFERENCE TO RELATED APPLICATIONS

This application claims the benefit of priority under 35 U.S.C. §119(e) of U.S. Provisional Patent Application No. 62/050,497, filed Sep. 15, 2014, entitled "On-Chip Linearity Calibration." The disclosure of the above-referenced application is incorporated herein by reference.

BACKGROUND

1. Field

This disclosure relates generally to linearity calibration, and more specifically, to on-chip linearity calibration.

2. Background

When a receiver is receiving weak wanted signals, strong interfering signals or blockers may also be present at the receiver input which can cause severe distortion due to the limited available signal swing in a low supply environment. In direct-conversion receivers, a significant distortion can arise from the second-order intermodulation (IM2) products. An amplitude-modulated interferer located at any carrier frequency can be down-converted into the wanted signal band if there is sufficient even-order nonlinearity in the receiver.

BRIEF DESCRIPTION OF THE DRAWINGS

The details of the present disclosure, both as to its structure and operation, may be gleaned in part by study of the appended further drawings, in which like reference numerals refer to like parts, and in which.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Early CDMA receivers relied on an external filter between the low-noise amplifier (LNA) and mixers to attenuate the blocking signals and obtain a sufficiently high second-order linearity. Recently, various input intercept point (IIP) improvement techniques have been developed with the goal to remove the need for the interstage RF filter. The large blockers due to transmitter leakage are the main reason that a highly linear receiver is required in a full-duplex system. Most of these receivers are implemented in the foreground and require the interruption of the normal operation of the receiver during calibration. However, due to the very high sensitivity of IIP to operating conditions, automatic background calibrations are desirable in order not to cause service interruption.

Certain embodiments as described herein provide for generating two-tone calibration signal on chip and injecting the signal in the receive (Rx) signal path for linearity calibration during online or idle mode. In one embodiment, the two-tone calibration signal is generated on chip using the transmit (Tx) signal path as a tone generator. As stated above, the generated two-tone calibration signal is routed to the Rx signal path at a point where the Rx signal path performance is not affected. In one embodiment, the linearity calibration includes calibrating the second-order input intercept point (IIP2). In another embodiment, the linearity calibration includes calibrating the residual sideband correction (RSB).

Figure 1:
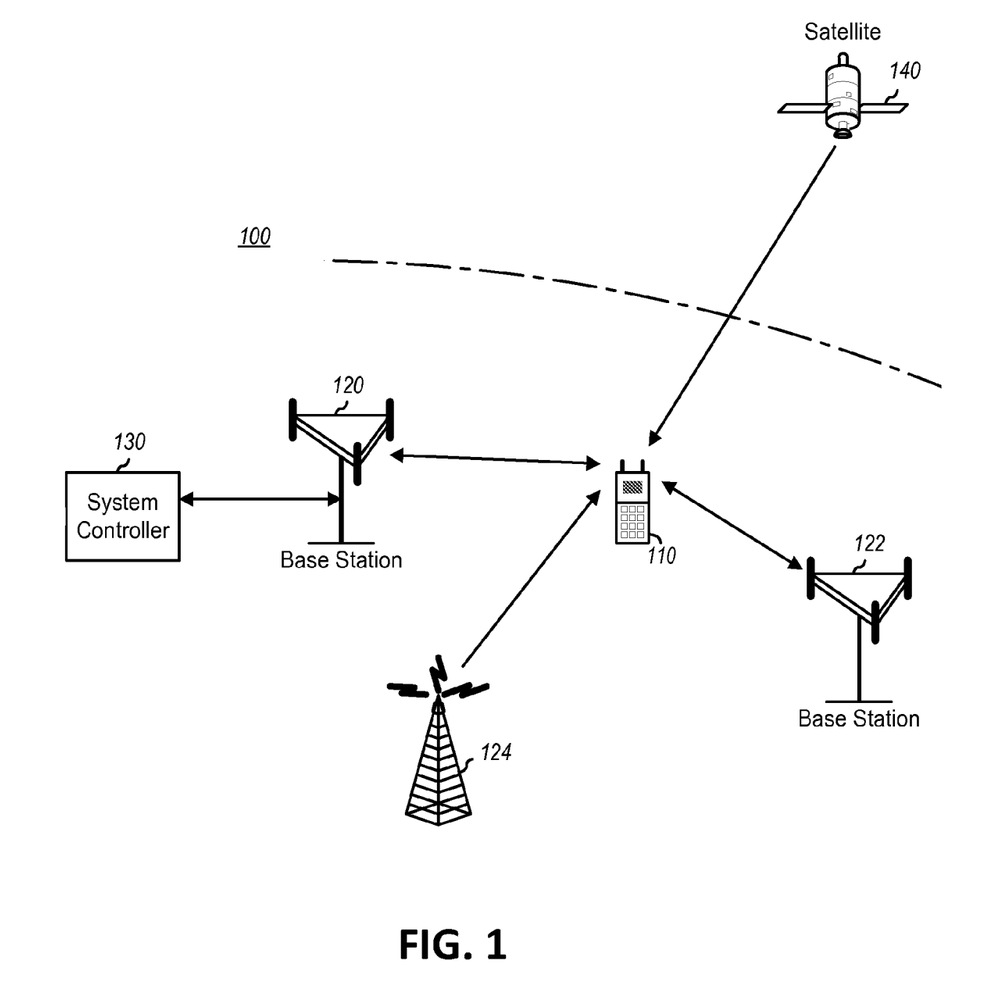
FIG. 1 is a wireless device communicating with a wireless communication system.

FIG. 1 is a wireless device 110 communicating with a wireless communication system 100. Wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless system 100 including two base stations 120 and 122 and one system controller 130. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 100. Wireless device 110 may also receive signals from broadcast stations (e.g., a broadcast station 124), signals from satellites (e.g., a satellite 140) in one or more global navigation satellite systems (GNSS), etc. Wireless device 110 may support one or more radio technologies for wireless communication such as LTE, WCDMA, CDMA 1×, EVDO, TD-SCDMA, GSM, 802.11, etc.

Figure 2:
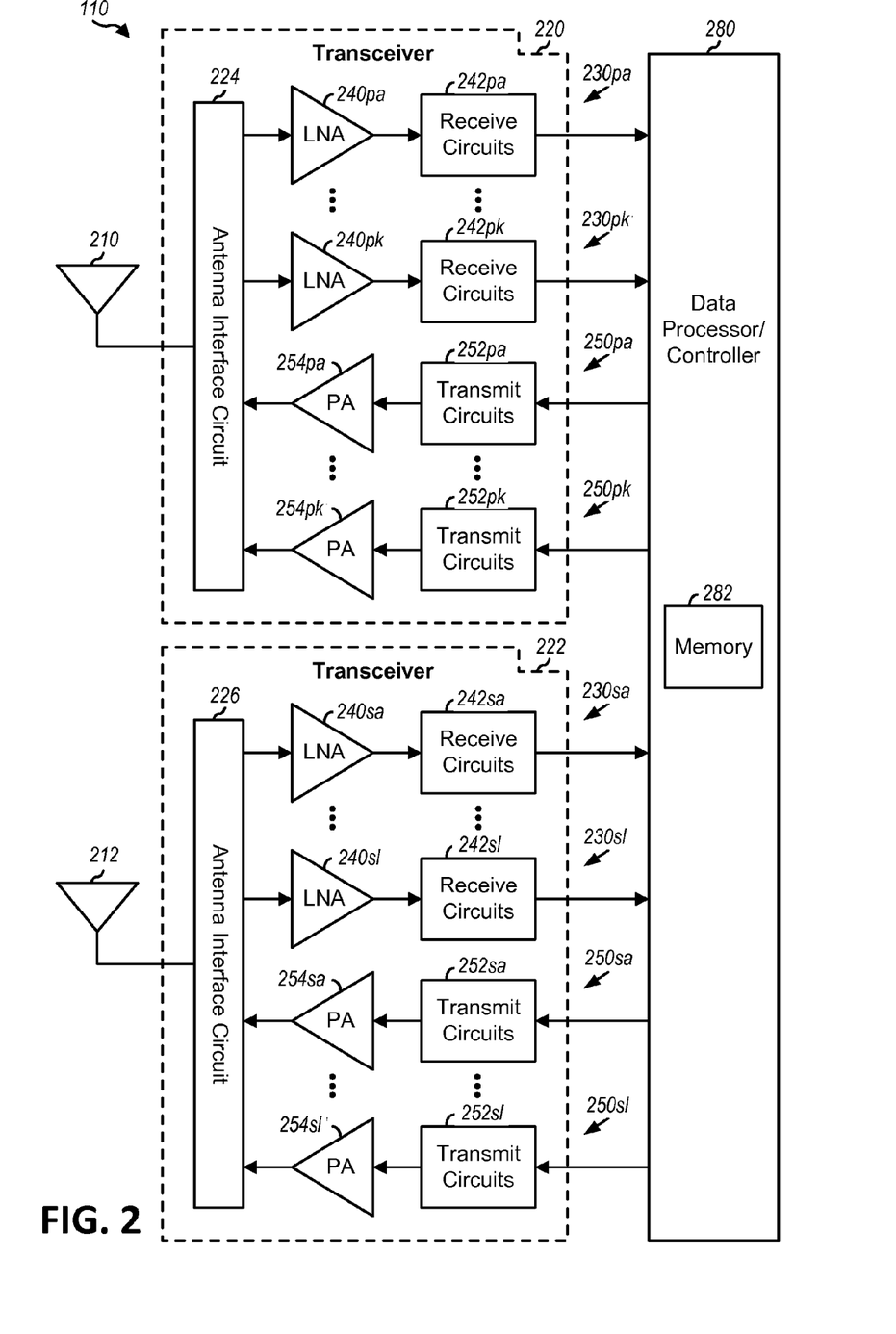
FIG. 2 is a block diagram of an exemplary design of wireless device shown in FIG. 1.

FIG. 2 is a block diagram of an exemplary design of wireless device 110 shown in FIG. 1. In this exemplary design, wireless device 110 includes a transceiver 220 coupled to a primary antenna 210, a transceiver 222 coupled to a secondary antenna 212, and a data processor/controller 280. Transceiver 220 includes multiple (k) receivers 230pa to 230pk and multiple (k) transmitters 250pa to 250pk to support multiple frequency bands, multiple radio technologies, carrier aggregation, etc. Transceiver 222 includes multiple (l) receivers 230sa to 230sl and multiple (l) transmitters 250sa to 250sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes an LNA 240 and receive circuits 242. For data reception, antenna 210 receives signals from base stations and/or other transmitter stations and provides a received RF signal, which is routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in similar manner as receiver 230pa.

In the exemplary design shown in FIG. 2, each transmitter 250 includes transmit circuits 252 and a power amplifier (PA) 254. For data transmission, data processor 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252pa may include amplifiers, filters, mixers, matching circuits, an oscillator, an LO generator, a PLL, etc. A PA 254pa receives and amplifies the modulated RF signal and provides a transmit RF signal having the proper output power level. The transmit RF signal is routed through antenna interface circuit 224 and transmitted via antenna 210. Each remaining transmitter 250 in transceivers 220 and 222 may operate in similar manner as transmitter 250pa.

FIG. 2 also shows an exemplary design of receiver 230 and transmitter 250. A receiver and a transmitter may also include other circuits not shown in FIG. 2, such as filters, matching circuits, etc. All or a portion of transceivers 220 and 222 may be implemented on one or more analog integrated circuits (ICs), RF ICs (RFICs), mixed-signal ICs, etc. For example, LNAs 240 and receive circuits 242 within transceivers 220 and 222 may be implemented on multiple IC chips. The circuits in transceivers 220 and 222 may also be implemented in other manners.

Data processor/controller 280 may perform various functions for wireless device 110. For example, data processor 280 may perform processing for data being received via receivers 230 and data being transmitted via transmitters 250. Controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Figure 3A:
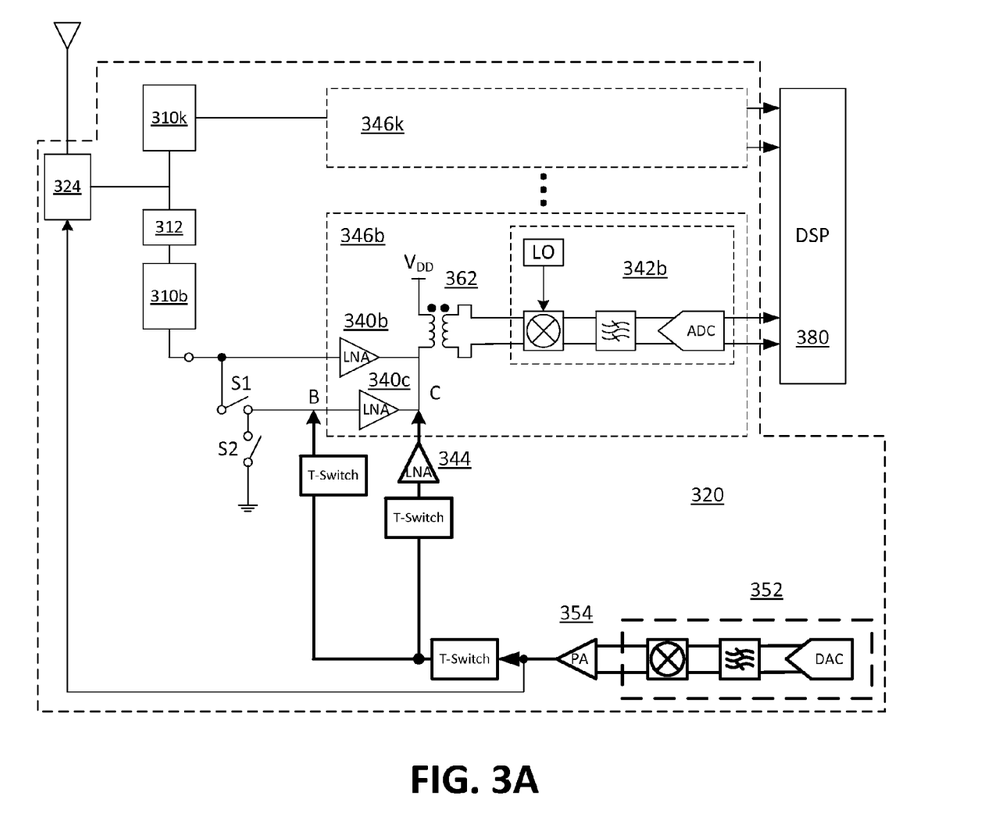
FIG. 3A is a schematic diagram of an exemplary transceiver in accordance with another embodiment of the present disclosure.

FIG. 3A is a schematic diagram of an exemplary transceiver 320 in accordance with another embodiment of the present disclosure. In the illustrated embodiment of FIG. 3A, the generated two-tone calibration signal is injected either at the input of LNA 340c (i.e., point B) or at the output of LNA 340c (i.e., point C). In this embodiment, LNA 340b is a high performance LNA and LNA 340c is a low performance LNA sharing the same port. Thus, the calibration signal can be injected into the input of the high performance LNA 340b by closing switch S1 and injecting the signal at point B.

The exemplary transceiver 320 of FIG. 3A includes an antenna interface circuit 324, a plurality of receivers 346b-346k, and a transmitter 352. In one embodiment, the transceiver 320 is coupled to a digital signal processor 380. First receiver 346b includes LNAs 340b, 340c, balun 362, and receive circuits 342b. Balun 362 is a single-ended-to-differential converter for the first receiver. The receive circuit 342b includes a mixer, a baseband filter, and an analog-to-digital converter (ADC). The receive circuit 342b also includes a local oscillator. The exemplary transceiver 320 also includes matching circuits 310b-310k for the plurality of receivers 346b-346k, respectively. The exemplary transceiver 320 further includes a surface acoustic wave (SAW) filter 312 coupled to the matching circuit 310b of the first receiver 346b and configured to filter radio frequency (RF) signal received from the antenna interface circuit 324 and direct the filtered RF signal to the first receiver 346b. Accordingly, in the illustrated embodiment of FIG. 3A, the first receiver 346b is configured as a SAW mode Rx chain (e.g., for Universal Mobile Telecommunications System (UMTS)). The exemplary transceiver 320 may be used for any one of transceivers 220, 222 in FIG. 2.

In the illustrated embodiment of FIG. 3A, the generated two-tone calibration signal is routed to the Rx signal path at a point where the Rx signal path performance is not affected. For example, the two-tone calibration signal is injected at the input of LNA 340c (at point B) in the first receiver 346b configured for UMTS saw mode Rx chain. In one embodiment, LNA 340b is used for high gain/performance, while LNA 340c is used for low gain/performance. In this case, the calibration signal is injected at point B and switch S1 is closed and switch S2 is opened to inject the calibration signal into the input of the high performance/gain LNA 340b. In another example, the calibration signal can be injected at point C at the output of LNA 340c through an auxiliary LNA 344. In this case, the calibration signal is injected at the single-ended-to-differential converting transformer (balun 362) to calibrate the amplitude imbalance introduced by the balun.

In FIG. 3A, the calibration signal from the Tx output is routed to the Rx input using a series of isolation switches (e.g., T-switches) to provide high isolation between the Rx and Tx signal paths. The switches in the loop back path can be fairly small providing minimal loading on the Rx LNA side and the Tx PA side such that the switches cause minimal degradation for the Rx signal path performance or sensitivity. In one embodiment, the T-switches on the Rx LNA side should be placed as close to the injection point as possible, while the T-switches on the Tx PA side should be placed as close to the PA as possible to provide the high isolation between the Rx and the Tx.

Figure 3B:
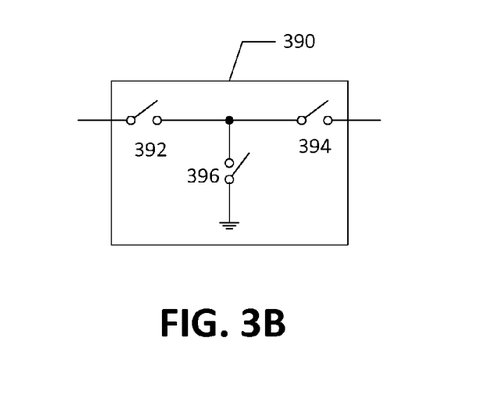
FIG. 3B is a schematic diagram of an exemplary isolation switch such as a T-switch suitable for video and other frequencies above 10 MHz.

FIG. 3B is a schematic diagram of an exemplary isolation switch such as a T-switch 390 suitable for video and other frequencies above 10 MHz. The T-switch 390 includes two analog switches 392, 394 in series with a third switch 396 connected between their common connection and the ground voltage. When the T-switch 390 is turned on, switches 392, 394 are closed and switch 396 is open. In the off state, switches 392, 394 are open and switch 396 is closed. In this off state, the signal tries to couple through the parasitic capacitance in parallel with each of switches 392, 394, but it is shunted to the ground by switch 396. Thus, in the illustrated configuration of FIG. 3B, the T-switch 390 provides better off-isolation than a single switch.

Figure 3C:
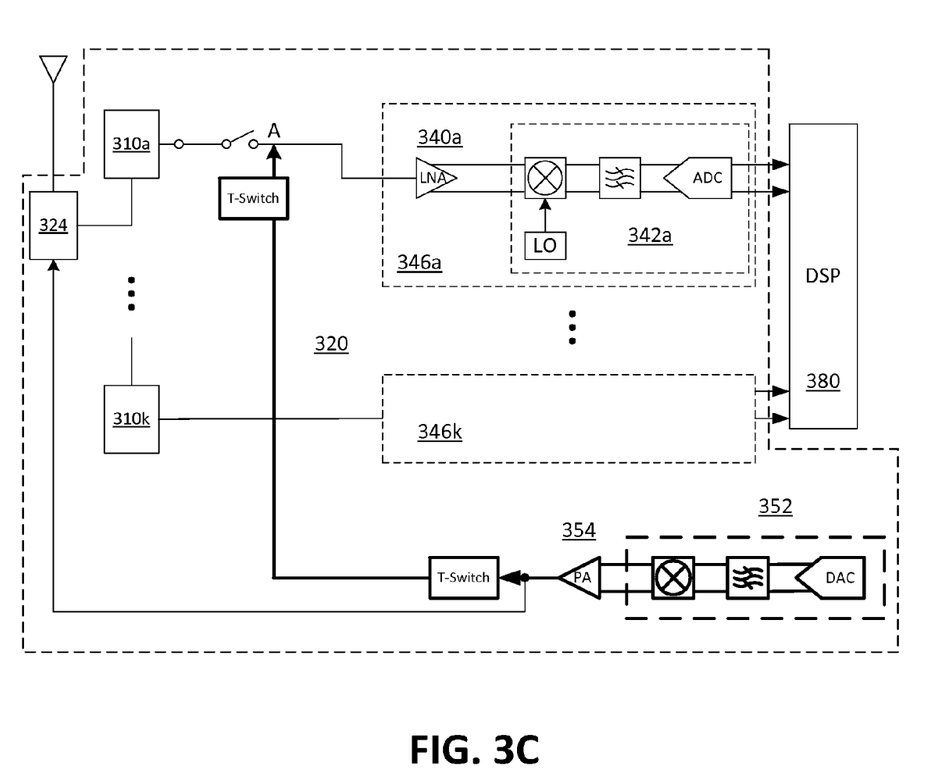
FIG. 3C is a schematic diagram of an exemplary transceiver in accordance with another embodiment of the present disclosure.

FIG. 3C is a schematic diagram of an exemplary transceiver 320 in accordance with another embodiment of the present disclosure. The exemplary transceiver 320 of FIG. 3C includes an antenna interface circuit 324, a plurality of receivers 346a-346k, and a transmitter 352. In one embodiment, the transceiver 320 is coupled to a digital signal processor 380. First receiver 346a includes LNA 340a and receive circuits 342a. Other receivers 346k can be similarly configured. In one embodiment, the first receiver 346a is configured as a sawless GSM receiver with a high performance LNA. In this embodiment, the first receiver 346a is a sawless Rx chain (e.g., for Global System for Mobile Communications (GSM)) because the front-end of this receiver 346a does not include a surface acoustic wave (SAW) filter. Each of the plurality of receivers 346a-346k includes a mixer, a baseband filter, and an analog-to-digital converter (ADC). Each receiver 346a, 346k also includes a local oscillator. The exemplary transceiver 320 also includes a matching circuit 310a-310k for each of the plurality of receivers 346a-346k. The exemplary transceiver 320 may be used for any one of transceivers 220, 222 in FIG. 2.

In the illustrated embodiment of FIG. 3C, the two-tone calibration signal is generated on chip using the transmit (Tx) signal path including a transmit circuit 352 and power amplifier (PA) 354 during an idle mode of the transceiver 320. This eliminates the need for a separate tone generation module. To generate the two-tone calibration signal with same amplitude tones, the Tx signal path should be configured to use either I or Q channel of the mixer and baseband filter, but not both. The power of the two-tone calibration signal can be controlled by changing the gain of the Tx signal path. For sawless modes, the power of the tone signal can be as low as −14 dBm. As stated above, the generated two-tone calibration signal is routed to the Rx signal path at a point where the Rx signal path performance is not affected. For example, the two-tone calibration signal is injected at the input of LNA 340a (at point A) in the first receiver configured for GSM sawless Rx chain.

Figure 3D:
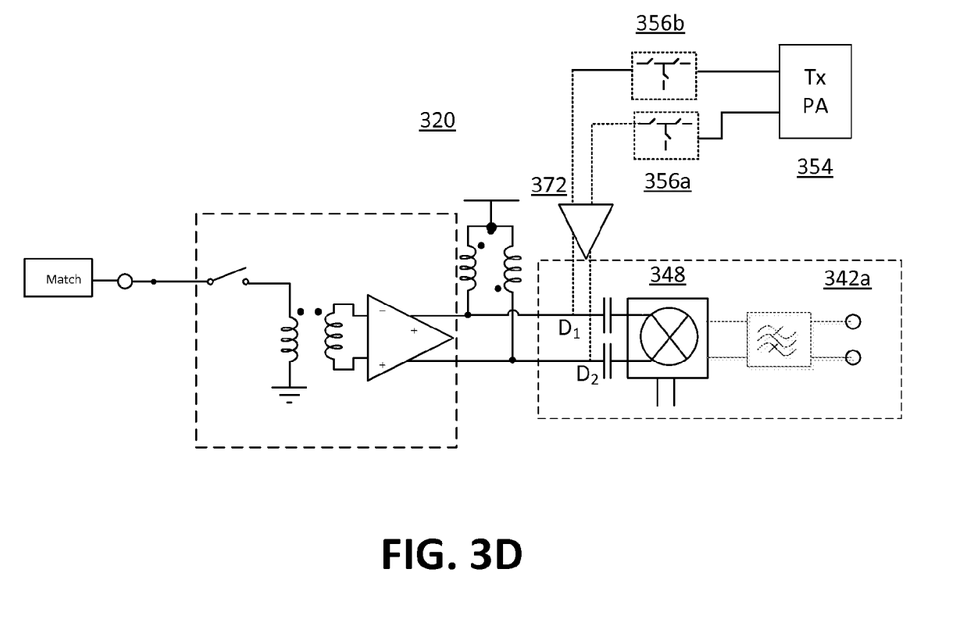
FIG. 3D is a schematic diagram of an exemplary transceiver (partial view) in accordance with yet another embodiment of the present disclosure

FIG. 3D is a schematic diagram of an exemplary transceiver 320 (partial view) in accordance with yet another embodiment of the present disclosure. In the illustrated embodiment of FIG. 3D, the output of the power amplifier 354 is injected into two T-switches 356a, 356b at the input (i.e., points $D_1$ and $D_2$) of the mixer 348 in the receive circuit 342a. In this embodiment, the output of the power amplifier is buffered using an auxiliary LNA 372 and the resulting output is injected at the input of the mixer 348.

Figure 3E:
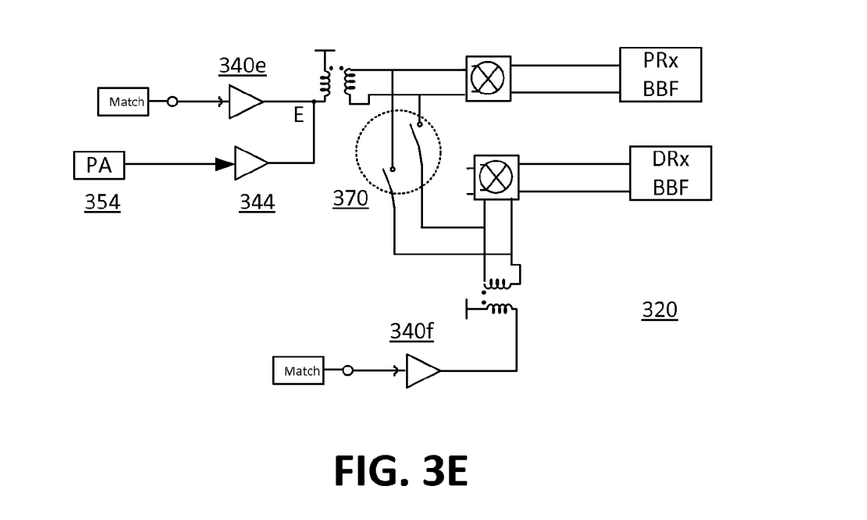
FIG. 3E is a schematic diagram of an exemplary transceiver (partial view) including a primary receiver (PRx), a diversity receiver (DRx), and a transmitter in accordance with yet another embodiment of the present disclosure.

FIG. 3E is a schematic diagram of an exemplary transceiver 320 (partial view) including a primary receiver (PRx), a diversity receiver (DRx), and a transmitter in accordance with yet another embodiment of the present disclosure. In the illustrated embodiment of FIG. 3E, the power amplifier 354 outputs and injects the generated two-tone calibration signal through a calibration LNA 344 at the output of a primary LNA 340e (i.e., point E). In this embodiment, switches 370 are used to configure between the primary receiver path with primary LNA 340e and the diversity receiver path with diversity LNA 340f.

Figure 4:
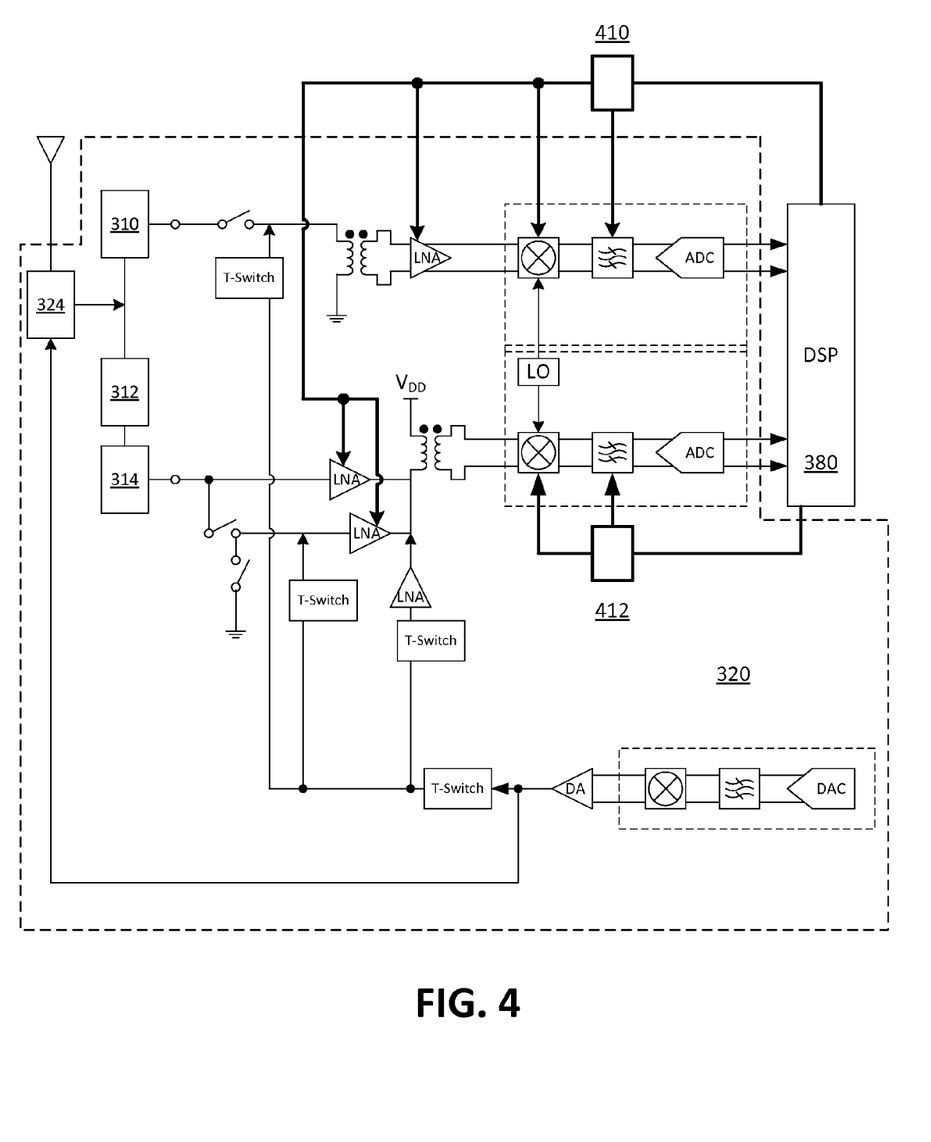
FIG. 4 is a schematic diagram of the exemplary transceiver highlighting paths of the linearity corrections being applied to LNAs, mixers, and baseband filters.

FIG. 4 is a schematic diagram of the exemplary transceiver 320 highlighting paths of the linearity corrections 410, 412 being applied to LNAs, mixers, and baseband filters. The applied corrections 410, 412 are calculated by the DSP 380 using the calibration signal injected into the Rx signal path. Although the corrections 410, 412 are applied to various elements in the transceiver 320, the main goal of the corrections is to automatically tune the gate bias of the mixer until the total second-order intermodulation product (IM2) at the baseband output reaches a minimum.

Figure 5:
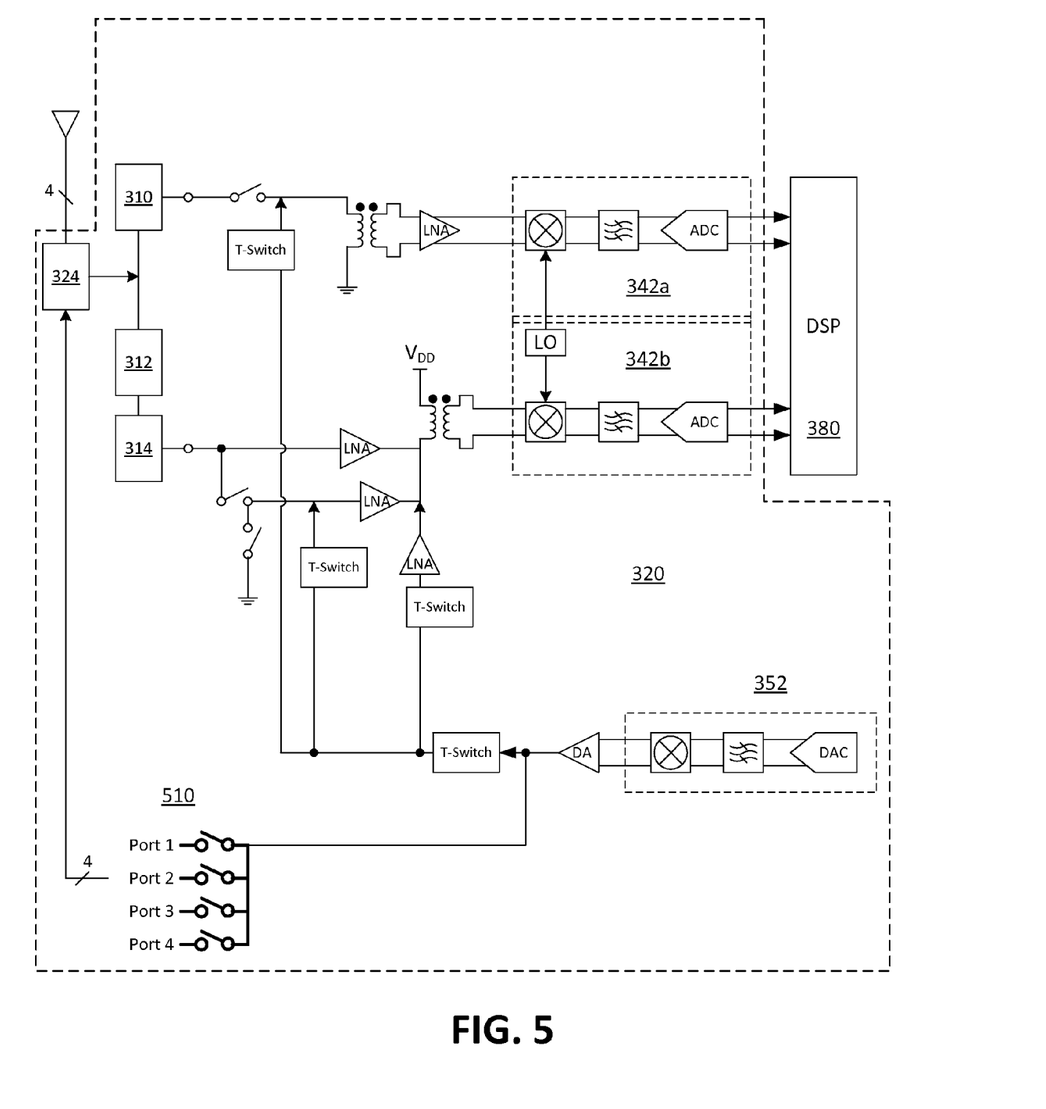
FIG. 5 is a schematic diagram of the exemplary transceiver highlighting an isolation block configured to prevent the broadcasting of the calibration signal generated by the Tx signal path through the antenna.

FIG. 5 is a schematic diagram of the exemplary transceiver 320 highlighting an isolation block 510 configured to prevent the broadcasting of the calibration signal generated by the Tx signal path through the antenna. In FIG. 5, all switches are kept open during calibration to prevent the signal from leaking out to the antenna ports.

Figure 6:
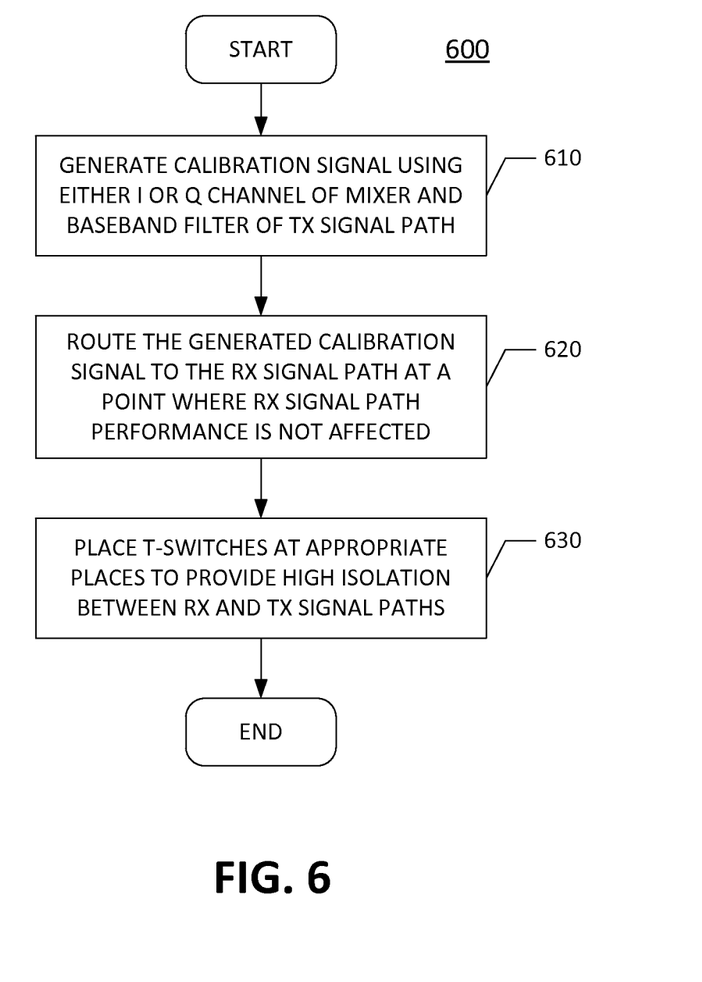
FIG. 6 is an exemplary flow diagram of a process for generating and routing the calibration signal using an on-chip Tx signal path of the transceiver according to one embodiment of the present disclosure.

FIG. 6 is an exemplary flow diagram of a process 600 for generating and routing the calibration signal using an on-chip Tx signal path of the transceiver 320 according to one embodiment of the present disclosure. In the illustrated embodiment of FIG. 6, the calibration signal is generated using either I or Q channel of the mixer and baseband filter of the Tx signal path, at step 610. The power of the calibration signal can be controlled by changing the gain of the Tx signal path. For SAW modes, the power of the calibration signal can be as low as −20 dBm, while for sawless mode, the power can be about −14 dBm. The generated two-tone calibration signal is routed, at step 620, to the Rx signal path at a point where the Rx signal path performance is not affected. For example, the calibration signal is injected at the input of LNA 340a (at point A) in the first receiver configured for GSM sawless Rx chain. In another example, the two-tone calibration signal is injected at the output of LNA 340c (at point C) in the second receiver configured for UMTS saw mode Rx chain. In this example, the calibration signal is injected at point C through an auxiliary LNA 344. In both examples, the calibration signal is injected before the single-ended to differential converter (balun) to calibrate the amplitude imbalance introduced by the balun. In a further example, the two-tone calibration signal can be injected at the input of LNA 340c (at point B) in the second receiver configured for UMTS saw mode Rx chain.

A series of T-switches are then placed at appropriate places, at step 630, to provide high isolation between the Rx and Tx signal paths. The switches in the loop back path can be fairly small providing minimal loading on the Rx LNA side and the Tx PA side such that the switches cause minimal degradation for the Rx signal path performance or sensitivity. In one embodiment, the T-switches on the Rx LNA side should be placed as close to the injection point as possible, while the T-switches on the Tx PA side should be placed as close to the PA as possible to provide the high isolation between the Rx and the Tx signal paths.

Figure 7:
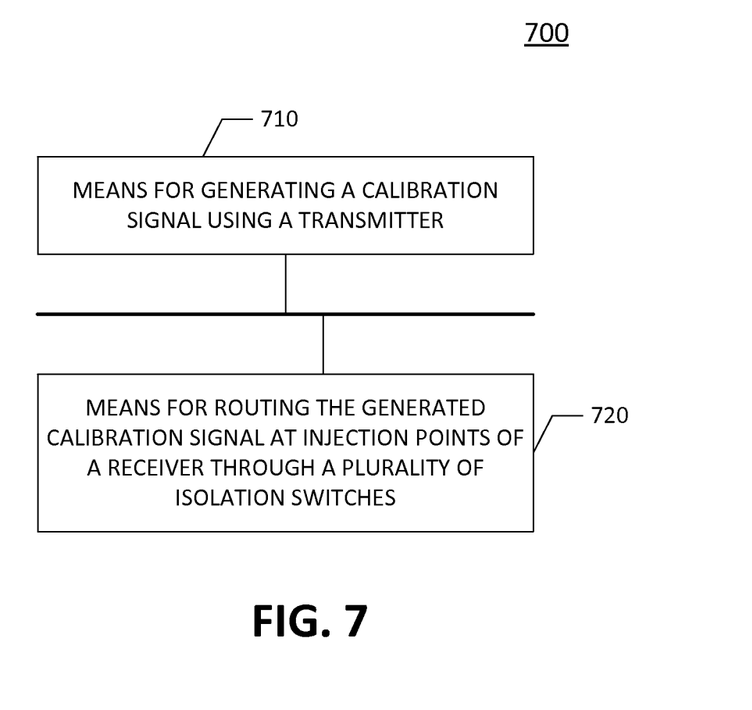
FIG. 7 is a functional block diagram of an exemplary apparatus configured for generating two-tone calibration signal on chip and injecting the signal in the receive (Rx) signal path for linearity calibration during online or idle mode in accordance with one embodiment of the present disclosure.

FIG. 7 is a functional block diagram of an exemplary apparatus 700 configured for generating two-tone calibration signal on chip and injecting the signal in the receive (Rx) signal path for linearity calibration during online or idle mode in accordance with one embodiment of the present disclosure.

In the illustrated embodiment of FIG. 7, the apparatus 700 comprises a first means 710 for generating a calibration signal using a transmitter. The apparatus 700 also includes a second means 720 for routing the generated calibration signal at injection points of a receiver through a plurality of isolation switches.

The transceiver described herein may be implemented on one or more ICs, analog ICs, RFICs, mixed-signal ICs, ASICs, printed circuit boards (PCBs), electronic devices, etc. The transceiver may also be fabricated with various IC process technologies such as complementary metal oxide semiconductor (CMOS). N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the transceiver described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM. CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   at least one receiver having injection points and having at least an amplifier and a transformer; and
   a plurality of isolation switches coupled to injection points of the at least one receiver, the plurality of isolation switches configured to route a calibration signal generated by a transmitter to one of the injection points.

2. The apparatus of claim 1, the calibration signal is routed to one of: (1) an output of the amplifier which is an input of the transformer; or (2) an input of the amplifier.

3. The apparatus of claim 1, the at least one receiver and the transmitter are configured on a single chip.

4. The apparatus of claim 1, the calibration signal is routed to the output of the amplifier through an auxiliary amplifier.

5. The apparatus of claim 1, the plurality of isolation switches includes a plurality of T-switches.

6. The apparatus of claim 1, the amplifier is a low noise amplifier.

7. The apparatus of claim 1, the calibration signal is a two-tone signal.

8. The apparatus of claim 7, the transmitter is configured to generate the two-tone signal using one of I or Q channel of a mixer and a baseband filter in the transmitter.

9. The apparatus of claim 1, the generated calibration signal is routed to an input of the amplifier in the at least one receiver through a switch.

10. A method comprising:
    coupling a plurality of isolation switches to injection points of at least one receiver, the at least one receiver having at least one amplifier and a transformer; and
    routing a calibration signal generated by a transmitter to one of the injection points using the plurality of isolation switches.

11. The method of claim 10, the injection points include one of: (1) an output of the at least one amplifier in the at least one receiver which is an input of the transformer in the at least receiver; or (2) an input of the at least one amplifier in the at least one receiver.

12. The method of claim 10, the calibration signal is generated during an idle mode of the transmitter and the at least one receiver.

13. The method of claim 10, the calibration signal is generated as a two-tone signal.

14. The method of claim 13, the two-tone signal is generated using one of I or Q channel of mixer and baseband filter of the transmitter.

15. The method of claim 13, further comprising
    controlling a power level of the two-tone signal by changing a gain of the transmitter.

16. The method of claim 10, the calibration signal is routed to an input of the at least one amplifier in the at least one receiver through an isolation switch.

17. The method of claim 10, the calibration signal is routed through an auxiliary amplifier.

18. An apparatus comprising:
    means for coupling a plurality of isolation switches to injection points of at least one receiver, the at least one receiver having at least one amplifier and a transformer; and
    means for routing a calibration signal generated by a transmitter to one of the injection points using the plurality of isolation switches.

19. The apparatus of claim 18, further comprising
    means for controlling a power level of the calibration signal by changing a gain of the transmitter.

20. The apparatus of claim 18, further comprising
    means for switching the calibration signal to an input of the at least one amplifier in the at least one receiver.

* * * * *